Oct. 7, 1924.
R. HOSKING, JR
PAN LIFTER
Filed May 11, 1923
1,511,128
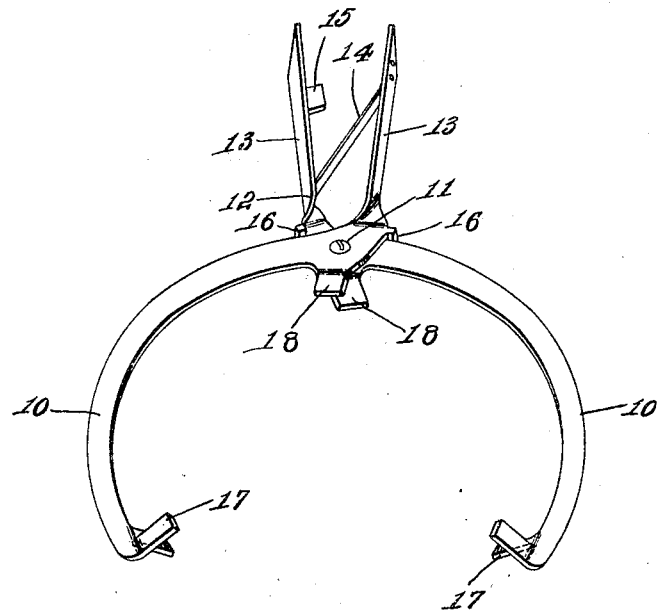
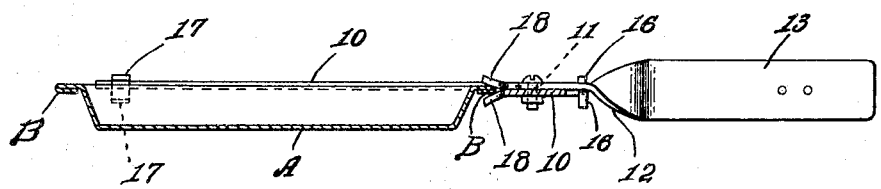
Robert Hoskings
INVENTOR
BY Victor J. Evans
ATTORNEY
WITNESS:

Patented Oct. 7, 1924.

1,511,128

UNITED STATES PATENT OFFICE.

ROBERT HOSKING, JR., OF BERKLEY, VIRGINIA.

PAN LIFTER.

Application filed May 11, 1923. Serial No. 638,327.

*To all whom it may concern:*

Be it known that I, ROBERT HOSKING, Jr., a citizen of the United States, residing at Berkley, in the county of Norfolk and State of Virginia, have invented new and useful Improvements in Pan Lifters, of which the following is a specification.

This invention relates to household devices, particularly to lifters, and has for its object the provision of a novel device for use in lifting and removing pie tins and cake pans from an oven, the device having the great advantage of permitting such tins or pans to be handled easily and conveniently as well as rapidly and without any danger of burning the hands of the operator.

An important and more specific object is the provision of a device of this character which is so constructed as to engage upon pans of different sizes and to hold the pan or tin at three points which will positively prevent rocking, tilting or any other undesired movement of the pan or tin.

An additional object is the provision of a device of this character which embodies several meritorious details of construction, which will be simple and inexpensive in manufacture, easy to handle, efficient and durable in use and a general improvement in the art.

With the above and other objects and advantages in view the invention consists in the details of construction to be hereinafter more fully described and claimed and illustrated in the accompanying drawings, in which:

Figure 1 is a perspective view of the device and

Figure 2 is a detail cross section showing one of the arms engaged upon the rim of a pan.

Referring more particularly to the drawings I have shown my device as comprising a pair of curved jaw members 10 formed preferably of sheet metal enameled or otherwise treated to have a pleasing appearance and to increase the durability. These jaw members are arranged in crossed relation and pivotally connected by means of a rivet or the like indicated at 11. At points spaced slightly from the pivotal connection the jaw members are twisted as indicated at 12 to define handles 13. The purpose of the twisting is to make the confronting sides and consequently the outer sides of the handles form a suitable grip.

Secured against the inner face of one handle is a leaf spring 14 which has its free end bearing against the inner face of the other handle for the purpose of normally holding the jaw members in their open position ready to be engaged upon a pan or tin such as that indicated at A, the pan being provided with a flange B. Closing movement of the jaws is limited by means of a lug 15 formed integrally upon one edge of one handle and engageable with the other handle, while the opening movement of the jaws is limited by small lugs 16 formed on the members near their pivots and each engageable with the other member as clearly indicated in Figure 1.

The means for gripping the pans or tins consists of oppositely extending inclined lugs or tongues 17 formed on the free ends of the jaws, and other oppositely inclined lugs 18 formed on the jaws near their pivotal connection.

In the use of the device it is suitably placed to bring the pairs of lugs or tongues 17 and 18 in engagement with the flange B of the tin or pan at the upper and lower surfaces thereof as indicated in Figure 2. While this is done the handles 13 are pressed together to bring the jaw members in clamping relation to the article being lifted so that the article may be held firmly and be prevented from tilting, slipping or otherwise moving while it is being taken from, or being placed within an oven or the like. While the device is intended primarily for use in handling hot pans, pie plates and the like, it is of course apparent that it is equally well adapted for use in handling them while putting them into an oven or into any other place. The device is bound to be a great time and labor saver and a distinct convenience in preventing burning of the fingers.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A lifter of the character described comprising a pair of curved jaw members pivoted in crossed relation and terminating at one end in handles, and pairs of lugs on the inner edges of said jaw members arranged in oppositely inclined positions whereby to be engageable upon the flange of a baking pan.

2. A lifter of the character described comprising a pair of curved jaw members pivoted in crossed relation and terminating at one end in handles, and pairs of lugs on the inner edges of said jaw members arranged in oppositely inclined positions whereby to be engageable upon the flange of a baking pan, a spring between said handles for normally holding the jaws in open position.

3. A lifter of the character described comprising a pair of curved jaw members pivoted in cross relation and terminating at one end in handles, and pairs of lugs on the inner edges of said jaw members arranged in oppositely inclined positions whereby to be engageable upon the flange of a baking pan, a spring between said handles for normally holding the jaws in open position, means for limiting opening movement of the jaws and means for limiting the closing movement.

4. A lifter for flanged pans comprising a pair of curved jaw members arranged in crossed relation and pivotally connected, said jaw members being twisted near their pivot points to define handles, a spring between said handles normally holding the jaws in open position, a lug on one edge of one handle engageable with the inner face of the other handle for limiting closing movement of the jaws, other lugs formed on said members near their pivot points with the lug of one being engageable with the outer edge of the other member for limiting opening movement of the jaws, a pair of lugs on the free end of each jaw members arranged in oppositely inclined positions, and other lugs on the inner edges of said members near their pivot points likewise arranged in oppositely inclined positions for engagement upon the flange of the pan to be lifted.

5. A lifter of the character described comprising a pair of curved jaw members pivoted in crossed relation and terminating at one end in handles, and lugs on the other ends of said jaws adapted to engage upon the flange of a pan to be lifted.

6. A lifter of the character described comprising a pair of curved jaw members pivoted in crossed relation and terminating at one end in handles, and means on the other ends of the jaws for embracing engagement with the flange of a pan to be lifted.

In testimony whereof I affix my signature.

ROBERT HOSKING, JR.